US010235703B2

(12) United States Patent
Herron et al.

(10) Patent No.: US 10,235,703 B2
(45) Date of Patent: Mar. 19, 2019

(54) METHOD OF TRACKING AND COMMUNICATING INFORMATION ABOUT A PERSON TO A PROVIDER OF GOODS OR SERVICES (75) Inventors: Neil Herron, Sunderland (GB); Gary McFarlane, Sunderland (GB)

(73) Assignee: Assist Mi Limited, Sunderland, Tyne & Wear (GB)

( * ) Notice: Subject to any disclaimer, the term of this patent is extended or adjusted under 35 U.S.C. 154(b) by 293 days.

(21) Appl. No.: 14/111,228

(22) PCT Filed: Apr. 12, 2012

(86) PCT No.: PCT/GB2012/050800
§ 371 (c)(1),
(2), (4) Date: Nov. 6, 2013

(87) PCT Pub. No.: WO2012/140423
PCT Pub. Date: Oct. 18, 2012

(65) Prior Publication Data
US 2014/0058895 A1 Feb. 27, 2014

(30) Foreign Application Priority Data
Apr. 12, 2011 (GB) .................................. 1106165.2

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0613* (2013.01); *G06Q 30/02* (2013.01); *G06Q 30/0205* (2013.01); *G06Q 30/0281* (2013.01)

(58) Field of Classification Search
CPC ............... G06Q 30/0613; G06Q 30/02; G06Q 30/0205; G06Q 30/0281
See application file for complete search history.

(56) References Cited

U.S. PATENT DOCUMENTS

2005/0197848 A1* 9/2005 Chou ................... G06Q 10/025
705/7.41
2006/0270421 A1* 11/2006 Phillips et al. ............... 455/457
(Continued)

FOREIGN PATENT DOCUMENTS

JP 2010-086098 A 4/2010
WO 02/12992 A2 2/2002

OTHER PUBLICATIONS

Wiebusch, B. (2000). Remote vehicle diagnostics provide valuable information. Design News, 55(5), 31. Retrieved from https://dialog.proquest.com/professional/docview/670072086?accountid=142257 (Year: 2000).*

(Continued)

*Primary Examiner* — William J Allen
*Assistant Examiner* — Anand R Loharikar
(74) *Attorney, Agent, or Firm* — Quarles & Brady LLP (57) ABSTRACT A method of tracking and communicating information about a person to a provider of goods or services is disclosed. A GPS enabled mobile phone is used to search for nearby sites of providers of a specific service. Once a service provider is selected, a route to that provider is advised and as the person travels towards the provider the separation between them is determined. As one or more geofences are broken during the journey warning messages are sent to the service provider indicating the pending arrival. The method is particularly useful where the service is to be provided to a disabled person as their accessibility needs can be identified in the message.

25 Claims, 5 Drawing Sheets

(56) References Cited

U.S. PATENT DOCUMENTS

2008/0169937 A1 7/2008 Lowry
2008/0243386 A1* 10/2008 Kumar et al. ............... 701/300

OTHER PUBLICATIONS

International Search Report issued in PCT/GB2012/050800 dated Jul. 18, 2012 (2 pages).
Written Opinion of the International Searching Authority issued in PCT/GB2012/050800 dated Jul. 18, 2012 (6 pages).
Search Report issued in Application No. GB1106165.2, dated Aug. 11, 2011 (2 pages).

* cited by examiner

Fig. 5

METHOD OF TRACKING AND COMMUNICATING INFORMATION ABOUT A PERSON TO A PROVIDER OF GOODS OR SERVICES

The present invention relates to a method, apparatus and computer program for tracking and communicating information about a person to a provider of goods or services and relates particularly, but not exclusively, to a method of improving a provider of goods or services to provide access to their goods or services to disabled customers. It also relates to a method for requesting assistance.

In many countries, legislation has been enacted to ensure that businesses that provide goods and services, such as shops, restaurants, petrol stations and the like, ensure that the goods and services that they offer are available to non-disabled and disabled customers alike. However, many disabled customers, on arrival at a business, find difficulty in effectively, efficiently and discretely making their assistance needs known to the business. This slows down the process for them receiving the goods and services of that business to the customer in question and can be disruptive to the provision of the goods or services of that business to other customers.

For example, whilst the majority of petrol stations in the UK are self service, many of these petrol stations make provision for disabled customers by providing a member of staff who can fill the vehicle with fuel whilst the customer remains in the car. However, on arrival at the petrol station, the customer has to make the member of staff aware of their arrival. One typical procedure for doing this is for the driver to sound the horn and then put on hazard lights or flash headlights until they are acknowledged by the staff. This can cause embarrassment to the customer since it not only draws the attention of members of staff but also other customers. Furthermore, for most petrol stations to be able to offer this assistance service requires two members of staff to be present on the premises. If both members of staff are occupied with other tasks at the time that the customer arrives and attracts their attention, there may be a delay before they are able to offer the assistance to the customer. This in turn slows down the service provided to other customers who must wait until the customer requiring assistance has been served.

There are also difficulties for people requesting assistance from providers of goods and services where the provider travels to the customer, for example a vehicle breakdown service that provides assistance to drivers of vehicles that have broken down. There is a safety concern that the person receiving the service may be vulnerable whilst waiting for the service; they are expecting an unknown person to provide assistance and cannot be sure whether any person arriving to provide assistance can be trusted.

Preferred embodiments of the present invention seek to overcome the above described disadvantages of the prior art.

According to an aspect of the present invention, there is provided claim a method of tracking and communicating information about a person to a provider of goods or services, comprising the steps of:
using a portable communications device having location determining means to determine a location, relative to a location of the device, of at least one provider of goods and/or services from a database of providers;
selecting at least one said provider; and
sending at least one first message to said at least one provider indicating that a person operating said device intends to travel to said provider.

By using a portable communications device to determine a present location and using this to select from a database of providers a provider and sending a message indicating the person's intention to travel to the provider, the advantage is provided that an efficient service can be provided to that person. This is particularly the case, for example if a wheelchair user driver wants to purchase petrol from a petrol station. The driver is able to determine from the list which petrol stations can provide assistance and that the petrol station can be forewarned of the driver's arrival and his assistance requirements. As a result, a member of staff can be immediately on hand to provide assistance, thereby preventing delays in providing assistance. This in turn improves the efficiency of the provision of service to other customers as they are not delayed be the person requiring assistance. Furthermore, the driver does not need to draw attention to themselves, by sounding their horn and flashing lights, as was previously the case.

The method may further comprise determining a separation between said device and said provider.

The method may further comprise including said separation in said first message.

By including the separation, which can be measured in distance or estimated time to arrival, in the message sent to the provider the advantage is provided that the provider is aware of the likely time before the person requiring assistance will arrive and can allocate staff appropriately.

The method may further comprise determining at least one separation trigger when said separation decreases to a predetermined separation;
periodically monitoring said separation; and
sending at least one second message to said at least one provider when said separation reaches at least one said separation trigger.

By monitoring the separation and sending a second message when the separation reaches a separation trigger, the advantage is provided that further information about the pending arrival of the person requiring assistance makes it much easier for the provider to allocate staff appropriately and efficiently.

In a preferred embodiment, at least one of said first and second messages comprises information about the person sending the message.

By including information about the person sending the message, the advantage is provided that, for example, with disabled users requiring assistance, the type of assistance required can be included in the message. This makes the interaction between the staff members from the provider and the person requiring assistance as efficient, effective and comfortable as possible.

In a preferred embodiment, at least one of said first and second messages comprises information about a vehicle the person is travelling in.

By including information about the vehicle the person is travelling in, the advantage is provided that the member of staff providing assistance can easily identify a vehicle as it arrives.

In a preferred embodiment, the information comprises accessibility requirements.

In another preferred embodiment, the information includes at least one photograph.

In a further preferred embodiment, the separation comprises a distance.

In a preferred embodiment, the separation comprises an estimated journey time for said person to arrive at said provider.

In another preferred embodiment, the trigger is a geofence.

In a further preferred embodiment, the geofence is defined by a radius around said provider.

In a preferred embodiment, the geofence is defined by a radius around said device.

In a further preferred embodiment, the geofence is an area defined by connected lines around said provider.

The method may further comprise determining first and second separation triggers at first and second predetermined separations and sending second at least one second message to said provider as each separation trigger is reached.

Maximum efficiency is achieved with this system by sending three messages. A first message is sent when a person requesting assistance makes the request, a second when they are a predetermined time away from the service provider and the final message as they arrive. These three messages allow initial alerting of the provider in order that staff can be aware and appropriately allocated, a second message giving suitably timed warning so that staff can get ready and a final message as the person arrives.

According to another aspect of the present invention, there is provided a method of tracking and communicating information about a person to a provider of goods or services, comprising the steps of:
receiving from a portable communications device having location determining means to determine a location, a request for a list of providers of goods and/or services relative to a location of the device;
sending said list to said device;
receiving from said portable device a selected at least one said provider; and sending at least one first message to said at least one provider indicating that a person operating said device intends to travel to said provider.

The method may further comprise determining a separation between said device and said provider.

The method may also further comprise including said separation in said first message.

The method may further comprise determining at least one separation trigger when said separation decreases to a predetermined separation;
periodically receiving location information from said device monitoring said separation; and
sending at least one second message to said at least one provider when said separation reaches at least one said separation trigger.

In another preferred embodiment, at least one of said first and second messages comprise information about the person sending the message.

In a further preferred embodiment, at least one of said first and second messages comprises information about a vehicle the person is travelling in.

In a preferred embodiment, the information comprises accessibility requirements.

In another preferred embodiment, the information includes at least one photograph.

In a further preferred embodiment, the said separation comprises a distance.

In a preferred embodiment, the separation comprises an estimated journey time for said person to arrive at said provider.

In another preferred embodiment, the trigger is a geofence.

In a further preferred embodiment, the geofence is defined by a radius around said provider.

In a preferred embodiment, the geofence is defined by a radius around said device.

In another preferred embodiment, the geofence is an area defined by connected lines around said provider.

The method may further comprise determining first and second separation triggers at first and second predetermined separations and sending second at least one second message to said provider as each separation trigger is reached.

According to another aspect of the present invention, there is provided a computer program for tracking and communicating information about a person to a provider of goods or services, comprising the steps of:
first computer code for enabling a user to use a portable communications device having location determining means to determine a location, relative to a location of the device, of at least one provider of goods and/or services from a database of providers;
second computer code for enabling a user to select at least one said provider; and
third computer code for sending at least one first message to said at least one provider indicating that a person operating said device intends to travel to said provider.

The computer program may further comprise fourth computer code for determining a separation between said device and said provider.

The computer program may also further comprise fifth computer code for including said separation in said first message.

The computer program may further comprise:
sixth computer code for determining at least one separation trigger when said separation decreases to a predetermined separation;
seventh computer code for periodically monitoring said separation; and
eighth computer code for sending at least one second message to said at least one provider when said separation reaches at least one said separation trigger.

In another preferred embodiment, at least one of said first and second messages comprise information about the person sending the message.

In a further preferred embodiment, at least one of said first and second messages comprises information about a vehicle the person is travelling in.

In a preferred embodiment, the information comprises accessibility requirements.

In another preferred embodiment, the information includes at least one photograph.

In a further preferred embodiment, the separation comprises a distance.

In another preferred embodiment, the separation comprises an estimated journey time for said person to arrive at said provider.

In a further preferred embodiment, the trigger is a geofence.

In a preferred embodiment, the geofence is defined by a radius around said provider.

In another preferred embodiment, the geofence is defined by a radius around said device.

In a further preferred embodiment, the geofence is an area defined by connected lines around said provider.

The computer program may further comprise ninth computer code for determining first and second separation triggers at first and second predetermined separations and sending second at least one second message to said provider as each separation trigger is reached.

According to another aspect of the present invention, there is provided a computer program of tracking and communicating information about a person to a provider of goods or services, comprising the steps of:

first computer code for receiving from a portable communications device having location determining means to determine a location, a request for a list of providers of goods and/or services relative to a location of the device;
second computer code for sending said list to said device;
third computer code for receiving from said portable device a selected at least one said provider; and
fourth computer code for sending at least one first message to said at least one provider indicating that a person operating said device intends to travel to said provider.

The computer program may further comprise fifth computer code for determining a separation between said device and said provider.

The computer program may also further comprise sixth computer code for including said separation in said first message.

The computer program may:
seventh computer code for determining at least one separation trigger when said separation decreases to a predetermined separation;
eighth computer code for periodically receiving location information from said device monitoring said separation; and
ninth computer code for sending at least one second message to said at least one provider when said separation reaches at least one said separation trigger.

In another preferred embodiment, at least one of said first and second messages comprises information about the person sending the message.

In a further preferred embodiment, at least one of said first and second messages comprises information about a vehicle the person is travelling in.

In a preferred embodiment, the information comprises accessibility requirements.

In another preferred embodiment the information includes at least one photograph.

In a further preferred embodiment, the separation comprises a distance.

In another preferred embodiment, the separation comprises an estimated journey time for said person to arrive at said provider.

In a further preferred embodiment, the trigger is a geofence.

In a preferred embodiment, the geofence is defined by a radius around said provider.

In another preferred embodiment, the geofence is defined by a radius around said device.

In a further preferred embodiment, the geofence is an area defined by connected lines around said provider.

The computer program may further comprise tenth computer code for determining first and second separation triggers at first and second predetermined separations and sending second at least one second message to said provider as each separation trigger is reached.

According to an aspect of the present invention, there is provided a method of alerting a provider of goods and/or services to a request, comprising the steps of:
sending at least one first message from a first portable communication device having location determining means, said message including a location of said device and at least one request;
sending at least one message to at least one mobile provider of goods and/or services indicating the location of said first device and said request, said mobile provider having at least one second portable communication device having location determining means;
determining a separation between said first device and said second device;
determining at least one separation trigger when said separation decreases to a predetermined separation;
monitoring said separation;
sending at least one second message to said first device when said separation reaches at least one said separation trigger.

By sending a message requesting help and allocating that help request to a vehicle and then sending subsequent messages to the person requesting help, the advantage is provided that the person waiting for assistance can be reassured that help will arrive shortly. Furthermore, it also improves safety by allowing information about the person coming to provide assistance, at least their estimated time of arrival, but also potentially including other identifying information such as vehicle registration or a photograph, video file or audio file (for blind passengers) of the driver of the assistance vehicle. This safety is particularly important for lone motorists where the service provided is a breakdown service and a lone motorist is stranded in their vehicle awaiting assistance. Furthermore, the present invention would be offer significant advantages to the emergency services allowing easy location of a potential patient and information about that patient before they arrive, significantly assisting paramedics. It can also be used by carers who are looking after people who require frequent medication allowing the recipient of care to call for assistance very easily and to be reassured that help is on it's way.

In a preferred embodiment, the first message comprises first information about the person sending the message.

In another preferred embodiment, the first information comprises accessibility requirements.

In a further preferred embodiment, the first information includes at least one photograph.

In another preferred embodiment, the first message comprises second information about a vehicle the person sending the message is travelling in.

By including accessibility requirements, a photograph and information about the vehicle in which a person is travelling in the first message, the advantage is provided that the person attending to a person requesting assistance can ensure they are providing the right sort of assistance to that person efficiently.

In a preferred embodiment, the second message comprises third information about the provider.

In another preferred embodiment, the third information includes at least one photograph relating to the provider.

In a further preferred embodiment, the second message comprises fourth information about a vehicle used by the provider.

By including information about the provider including a photograph and message about the vehicle that they are travelling in, the advantage is provided that the person receiving assistance can be assured that the person they are dealing with is the correct provider. This increases the safety of the person receiving assistance, in particular if they are a vulnerable person.

According to another aspect of the present invention, there is provided a computer program for alerting a provider of goods and/or services to a request, comprising the steps of:
first computer code for sending at least one first message from a first portable communication device having location determining means, said message including a location of said device and at least one request;
second computer code for sending at least one message to at least one mobile provider of goods and/or services indicating the location of said first device and said request, said mobile provider having at least one second portable communication device having location determining means;

third computer code for determining a separation between said first device and said second device;

fourth computer code for determining at least one separation trigger when said separation decreases to a predetermined separation;

fifth computer code for monitoring said separation;

sixth computer code for sending at least one second message to said first device when said separation reaches at least one said separation trigger.

In a preferred embodiment, the first message comprises first information about the person sending the message.

In another preferred embodiment, the first information comprises accessibility requirements.

In a further preferred embodiment, the first information includes at least one photograph.

In another preferred embodiment, the first message comprises second information about a vehicle the person sending the message is travelling in.

In a further preferred embodiment, the second message comprises third information about the provider.

In another preferred embodiment, the third information includes at least one photograph relating to the provider.

In a further preferred embodiment, the second message comprises fourth information about a vehicle used by the provider.

Preferred embodiments of the present invention will now be described by way of example only, and not in any limitative sense, with reference to the accompanying drawings.

Figure 1:
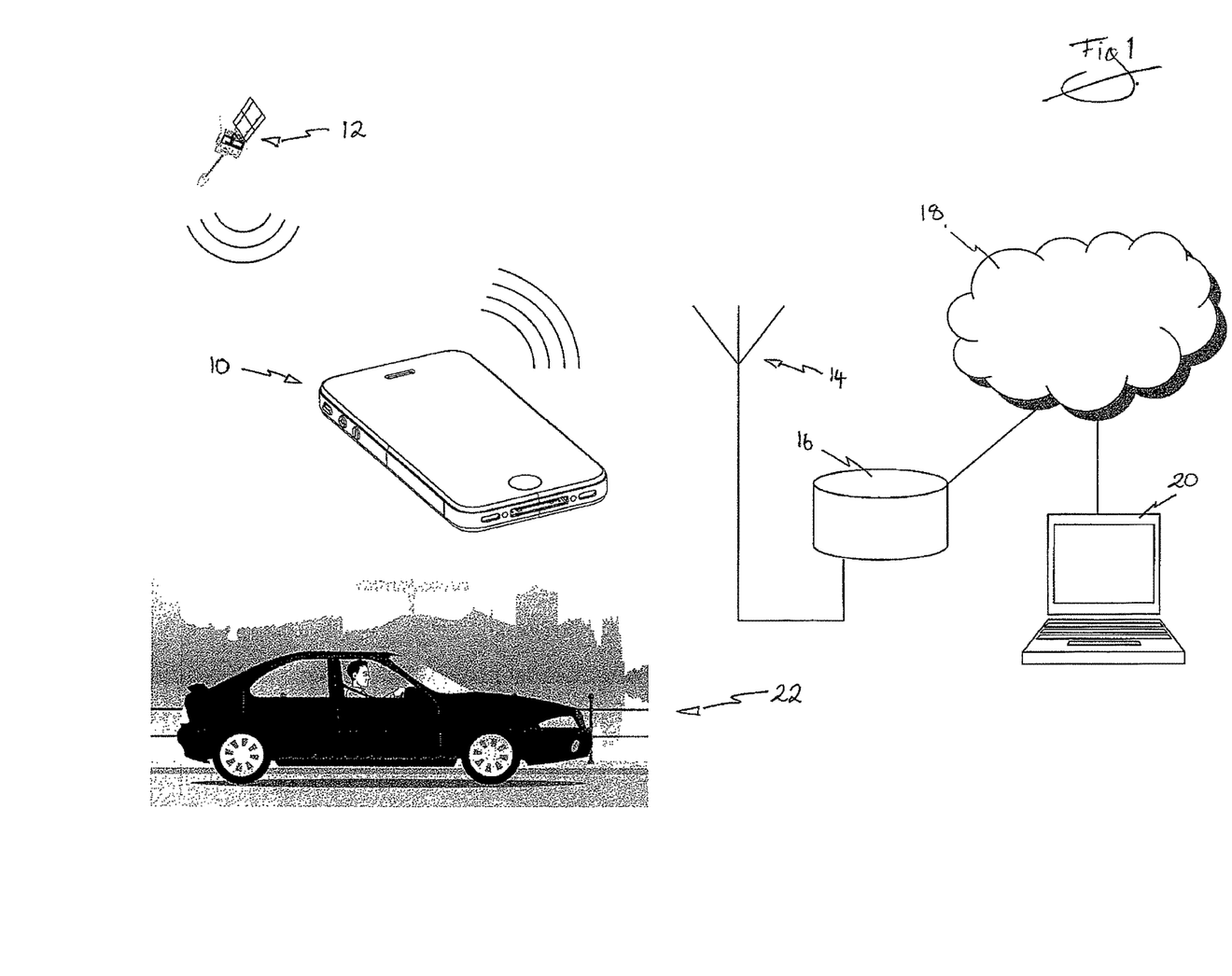
FIG. 1 is a schematic representation of apparatus used to operate the method of the present invention.
Figure 2:
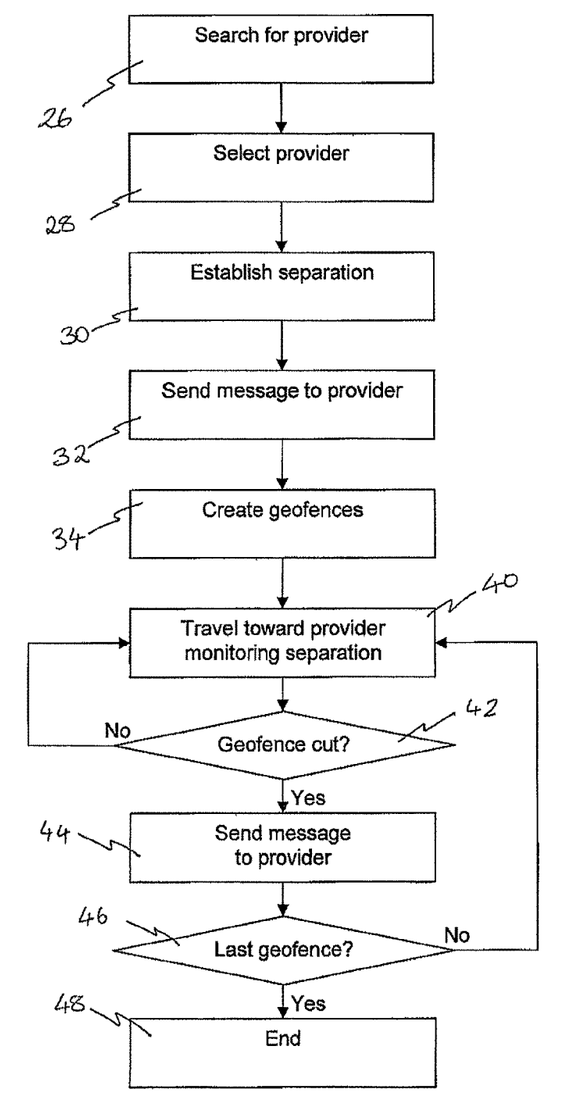
FIG. 2 is a flow chart representing steps undertaken in the method of the present invention.
Figure 3:
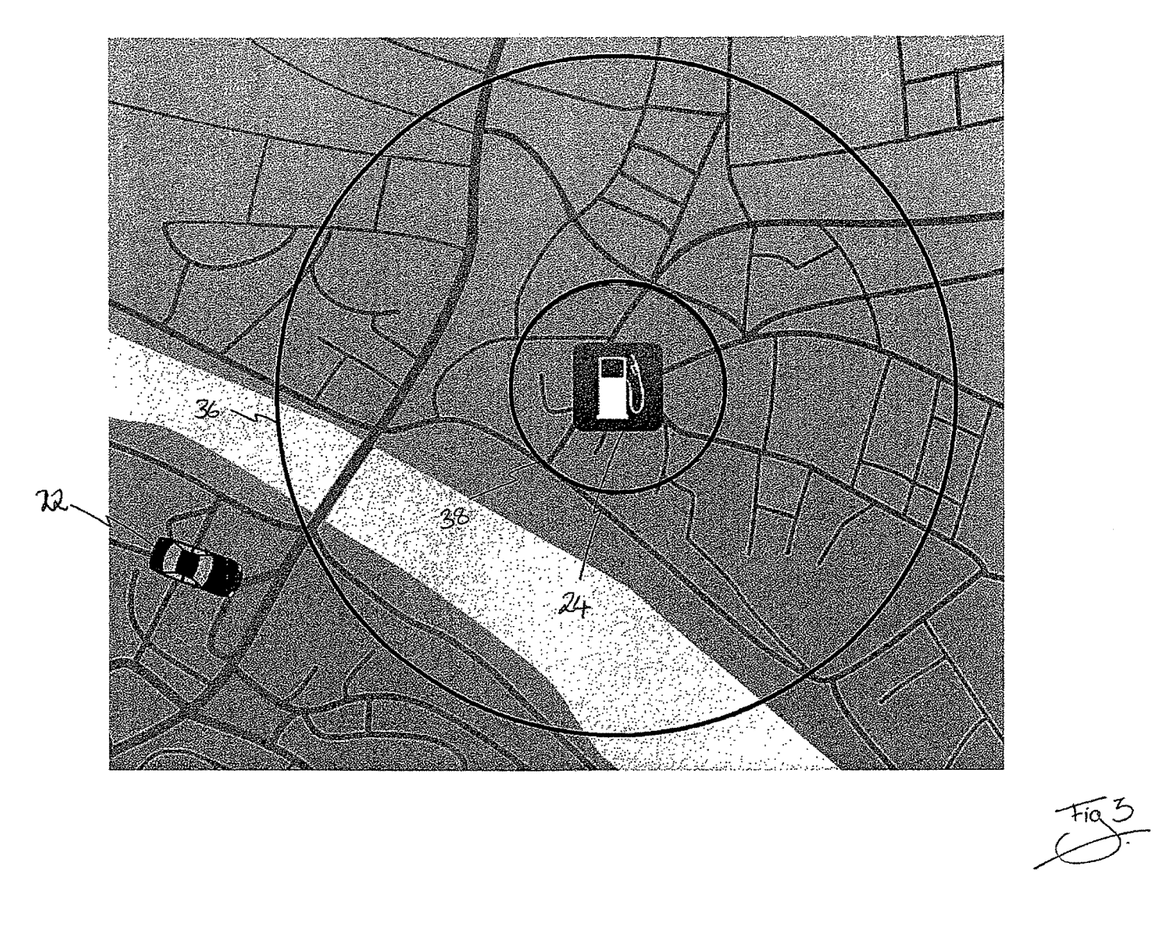
FIG. 3 is a representation of part of the method of the present invention.

Referring to FIGS. 1-3, a portable communication device having location determining means to determine its location, such as a GPS enabled mobile telephone or mobile communication device 10 uses GPS signals received from GPS satellites 12 to determine its location. Mobile device 10 is able to communicate information wirelessly via a receiving aerial 14 to a server 16. Server 16 is connected to the internet 18 which is in turn connected to a computer device 20 that is operated by a service provider.

The following example sets out how the apparatus described above can be used to track and communicate information about a person to a provider of goods and services. In this example, a wheelchair user is driving their vehicle 22 to a petrol station 24. The driver of vehicle 22, on realising that the vehicle needs more fuel, stops the vehicle and uses mobile device 10 to connect to the internet 18 via aerial 14. Mobile device 10 uses signals produced by GPS satellites 12 to determine its location and sends this information, together with a request for a specific type of good or service (a petrol station that can provide assistance to a wheelchair user), to server 16 via aerial 14. Server 16 searches for suitable providers nearby the location of mobile device 10 and sends a list of suitable providers. The information located in the search includes at least provider location and may also include provider name, accessibility information and distance to provider from the present location (Step 26). The information is displayed on the screen of mobile device 10 as a list or as locations on a map, or both. The driver selects a suitable provider (Step 28) and a separation between the mobile device 10 and the provider, petrol station 24, is established (Step 30).

The separation can be determined as a distance and this distance can either be the shortest distance, as a straight line measured from the mobile device to the provider, or may take account of a journey route suggested by journey planning software either on the mobile device 10 or server 16. The separation can equally be an estimated time to travel from the present location of the vehicle 22 to the petrol station 24 along such a suggested route and can take into account live traffic information. Alternatively, the journey time can be estimated simply for the time it takes to typically travel the distance calculated as a direct distance.

In a further alternative, the distance can be calculated from historical data for journeys from around the determined location to the service provider. At Step 32, once the separation has been determined, a message is sent from server 16 to computer 20 at petrol station 24 indicating that vehicle 22 is travelling towards petrol station 24. This first message typically includes information about the person including accessibility requirements and may include a photograph and can also include information about the vehicle, such as registration number, make and colour and may also include a photograph of the vehicle.

Server 16 then creates, at Step 34, at least one, and preferably two, geofences 36 and 38. These geofences are imaginary boundaries set around petrol station 24 at different separations with first geofence 36 representing a greater separation than second geofence 38 which represents a much smaller separation from petrol station 24. The separation can be measured as a direct distance, as shown in FIG. 3, or can alternatively be an estimated travel time. As vehicle 22 travels towards petrol station 24, at Step 40, the separation between the vehicle and petrol station continues to be monitored. If the separation decreases between a predetermined level, then the first of the geofences 36 has been cut or crossed at this point, as tested at Step 42. If the geofence has been crossed, a second message is sent from server 16 to computer 20 at Step 44. This second message will typically contain the same information as the first message but indicates that the vehicle is now a predetermined separation, distance or estimated time, from the petrol station.

It is then determined at Step 46 whether the crossed geofence is the closest geofence to the service provider 24 and if it is not, the travel and separation monitoring is continued at Step 40. When the final geofence 38 is cut or crossed at Step 42, a further message is sent to the service provider 24 indicating that the vehicle 22 is about to arrive. Since this is the last geofence, the operation then ends at Step 48.

Upon receiving the first message, indicating the intention to travel to the service provider 24, the service provider can alert suitable members of staff that a vehicle requiring assistance is intending to travel. It is also possible that in the event that the service provider cannot provide assistance at that time, a message can be sent to the mobile device 10 indicating that assistance cannot be provided, thereby allowing the person to select an alternative service provider. When the second message is sent, upon crossing the first geofence 36, the service provider can alert staff to the pending arrival of a vehicle requiring assistance. The size of the geofence can be determined to accommodate the service provider's needs, depending upon the time it takes to mobilise staff to provide assistance. When the third message is sent, on the breaking of second geofence 38, the staff can be alerted to the immediate, or almost immediate, arrival of the vehicle and can go to provide assistance. By providing efficient assistance the moment it is required, the wheelchair using driver of vehicle 22 is able to purchase fuel as efficiently as any other person using the petrol station. Furthermore, they do not need to draw attention to themselves.

Set out below are examples of the programming environments used in the development of the invention set out above. Nokia WRT is the development environment used for Symbian mobile device application. jQuery is the JavaScript library used for mobile application user interface. Coldfusion is the server side application environment used for data access and administration areas. MySQL is the database server for storage of user details and service provider details. It will be immediately apparent that the above list of programming environments are merely example of those that could be used and many other environments are suitable for the implementation of the present invention. Alternatively, the development environment used for development iPhone® application is the XCode 4. All application code is written using Objective-C and using the iPhone SDK. The development environment used for development of the Windows® Mobile application is Visual Studio 2010. All application code is written in C# and using the Windows Mobile SDK. The development environment used for development of the Android® application is Eclipse. All application code is written in Java and using the Android SDK. The BlackBerry® Java® Development Environment (BlackBerry JDE) Java Platform, Micro Edition (Java® ME) applications are used for Java® based BlackBerry smartphones including Location Picker: high level picker that allows users to choose a location from a list defined by a third-party application. The server side application for the admin system which is used by all the mobile apps is developed using Microsoft Technologies and built as an ASP.NET MVC application which resided on the Microsoft IIS 7 web server. SQL Server is used as the back-end database used by the admin system. All code is developed in C#.

It should also be noted that alternatively the geofence could be created around the vehicle and the geofence move along with the vehicle until the petrol station cuts the geofence. It will be noted that this is in effect the same as the example described above. In a further alternative, the geofences may not be regular shapes, in particular circles shown in FIG. 3, and may be irregular shapes in which the determination of the vehicle reaching a predetermined separation is also dependent upon the location of the vehicle. For example, if a petrol station is located in a complex one-way system, it may be possible to drive very close to the petrol station, thereby cutting the first and even second geofences 36 and 38, but need to travel outside the geofences again in order to travel along an accessible route to the petrol station. In this instance, it is sensible to reduce the size of the geofence at locations where the distance to travel to the petrol station is still significant due to the presence of the one-way system. In a further alternative the geofence can be deemed to have been cut simply once the monitored separation (however calculated) drops below a predetermined level.

The present system is equally applicable to other providers of goods and services. For example, a hotel or airport can provide better assistance to those with accessibility needs by being forewarned of the pending arrival of a disabled customer. The present invention would provide this improved assistance for disabled customers in many service sectors not limited to those set out above. Furthermore, the present invention is not limited to any mode of transport. The invention can also be used where transportation is by rail, bus or where the customer is walking. It is also the case that in the present invention need not only apply to disabled customers, in an shop or hotel for example, early warning of the pending arrival of a very important customer, such as a regular customer, can be warned when the customer has indicated their intention to use the service, and this customer can be suitably greeted.

In a further enhancement of the present invention two way communication may also be included in any suitable form including by written message (displayed in the application or via email, SMS message or similar means) by audio message (telephone call or recorded message) or by live or pre-recorded video message. For example, on some exceptional occasions it may not possible for a petrol station to offer assistance to a disabled customer. Therefore having received a message from a potential customer, it may be necessary to contact them in order to indicate that their request for assistance cannot be met using any of the means set out above. In another example a potential customer may wish to add a further message when making their request and this message can be acknowledged by the provider.

Figure 4:
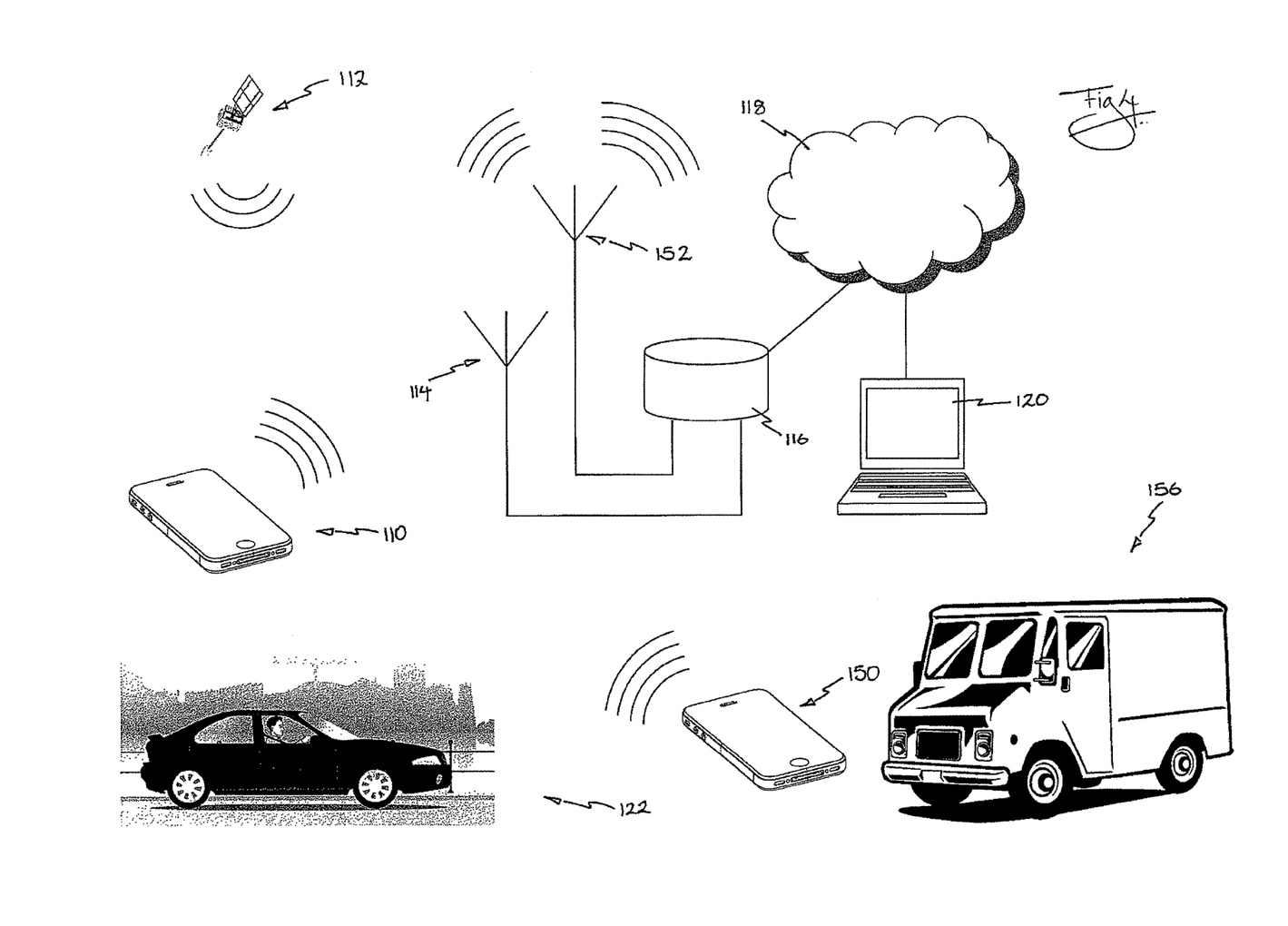
FIG. 4 is a schematic representation of apparatus used to operate another aspect of the present invention.
Figure 5:
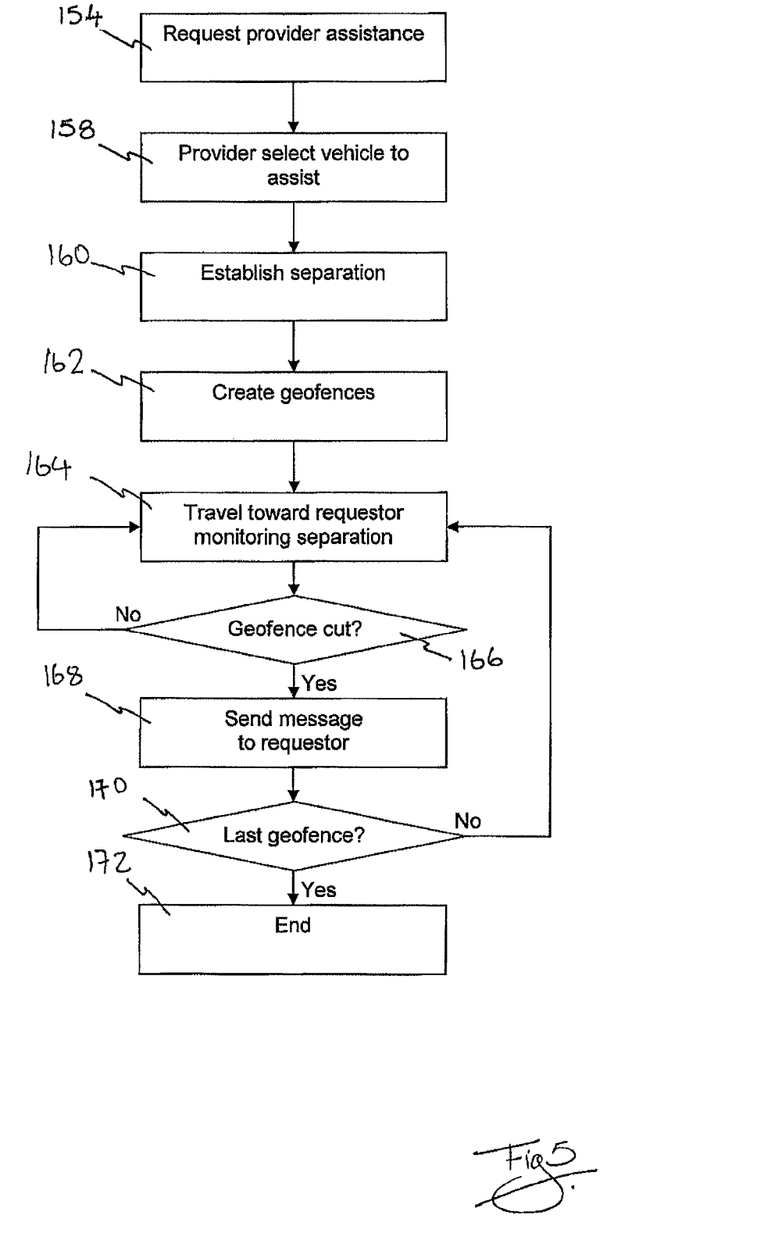
FIG. 5 is a flow chart representing steps undertaken in another aspect of the present invention.

In an alternative embodiment of the present invention, described with reference to FIGS. 4 and 5 and in which parts in common with those in FIGS. 1 to 3 have been given like reference numerals increased by 100, a first portable communication device having location determining means to determine its location, such as a GPS enabled first mobile communication device 110 uses GPS signals received from GPS satellites 112 to determine its location. First mobile device 110 is able to communicate information wirelessly via a receiving aerial 114 to a server 116. Server 116 is connected to a computer device 1120 that is operated by a service provider and this connection is typically via the internet 118, but could alternatively be a direct connection.

In a present invention a second portable communication device also having location determining means, such as a GPS enabled second mobile communication device 150 is also able to transmit information wirelessly via a receiving aerial 114. In the embodiments shown this is the same receiving aerial as used by the first mobile device 110. However, alternatively this may be a second receiving aerial which may be connected to a second server that is able to communicate with the first server 116. Both the first and second mobile devices 110 and 150 are able to receive data transmitted from a transmitting aerial 152 that is also connected to server 116. Alternatively transmitting aerial 152 may be connected to a second server that is in communication with the first server 116.

The following example sets out how the apparatus described above can be used to alert a provider of goods and/or services to a request for such goods or services. In this example the first mobile device 110 is operated by the driver of a first vehicle 122. In the event that the first vehicle 122 breaks down, the driver uses a computer program running on mobile device 110 to request assistance from a vehicle break down service. The mobile device 110 sends a message via aerial 114 and server 116 to computer device 120 requesting assistance (step 154). Computer device 120, or an operator of computer device 120, selects a vehicle 156 to provide assistance. The vehicle 156 is selected from a fleet of vehicles and the selection is made on the basis of a number of criteria including availability to provide assistance immediately, distance from location where assistance is required. The driver of vehicle 156 has a second mobile device 150 which receives a message from computer device 120 via server 116 and transmitting aerial 152 indicating that assistance is required by vehicle 122. This message typically contains at least location information for vehicle 122 (which may be automatically entered into a route finding program to suggest a route to that location). The message will also typically provide information about the person requiring assistance, including disability information, a photograph and information about the vehicle. Mobile device 150 may alternatively be a dedicated device for communicating with computer device 120 providing only the necessary channels of communication for completing the functions set out herein and not providing additional services such as telephony.

Computing device 120 receives, or has already received, information from mobile devices 110 and 150 indicating their locations, as calculated from the signals from GPS satellites 112. From this data the separation between the vehicles 122 and 156 is calculated at step 160. As with the previous embodiment this separation can be calculated as a direct distance from one vehicle to the other, a calculated distance based on a recommended journey route from one vehicle to the other or an estimated time of travel based on either of these distances and optionally also including information relating to traffic conditions. Once the separation is calculated at least one separation trigger is determined to instigate further action when the separation between the two vehicles decreases to the, or each, predetermined separation trigger. These separation triggers can be simply set as a separation value that when the separation decreases below these values instigates the action. Alternatively they can be set up as a geofence (step 162) around either the broken down vehicle 122 or the recovery vehicle 156. Typically this geofence is a radius around the vehicle but if the geofence is set around the broken down, and therefore non-moving, vehicle 122 the geofence can be an irregular shape taking account of the road network and traffic conditions surrounding the vehicle so as to avoid the situation described above where the recovery vehicle passes into the geofence and then out again in order to travel to the broken down vehicle 122.

The recovery vehicle 156 travels towards the broken down vehicle 122 and the separation is monitored at step 164. This separation is monitored by both mobile devices 110 and 150 transmitting location data via aerial 114 and server 116 to computer device 120. The computer device 120 determines whether the geofence has been cut (or the separation is decreased below the trigger separation) at step 166. If the geofence has not been cut the monitoring continues at step 164. However, if the geofence has been cut a message is sent to mobile device 110 (step 168). This message typically includes the separation between the two vehicles, either as a distance or an estimated time until the recovery vehicle 156 will arrive, and may include information about the recovery vehicle 156, for example a number plate, and about the driver, for example a photograph. If more than one geofence has been set up and the geofence that was cut at step 166 is not the last geofence (as tested at step 170) the separation monitoring continues at step 164 as recovery vehicle 156 travels towards broken down vehicle 122. However, if this geofence was the last geofence then the process ends at step 172.

Further messages may also be sent as part of this process. For example, a first message indicating person allocated may be sent at step 158 and a second message can be sent when the driver of vehicle 156 indicates, via his mobile device 150, that he is on his way. The further messages reporting separation, as set out above, will be sent as the separation is monitored. The sending of the second message, indicating the driver is travelling to the broken down vehicle 122, can be used to instigate the monitoring of the separation, just in case the vehicle has to travel near to vehicle 122 on another job before it can get to this vehicle.

The present invention can also be used by the emergency services to receive information about a person's disabilities before they arrive. It will also be useful for disable and non-disables people requesting assistance from their homes, for example from utility companies. The messages of the pending arrival of assistance and information about the person who is arriving so as to assist then with checking credentials and ensuring that the person arriving is not a bogus caller.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A method of tracking and communicating information about a person to a provider of goods or services, comprising steps of:

determining, by a portable communications device having a processor, a display, an aerial and a GPS location detector, a location of at least one provider of goods or services relative to a location of the portable communications device from a database of providers; wherein:
the portable communications device connects to a network via the aerial, uses signals produced by GPS satellites to detect a location of the portable communications device, and transmits the location of the portable communications device, together with a request for a specific type of good or service, to a server via the aerial; and
the portable communications device receives from the server a list of providers nearby the location of the portable communications device;

presenting the list of providers on the display of the portable communications device;

selecting, by a user of the personal communications device, the at least one provider from the list of providers presented on the display;

receiving, by the server from the portable communications device via the network, the at least one selected provider;

sending, by the server, at least one first message via the network to the at least one selected provider indicating that the user intends to travel to the at least one selected provider, the at least one first message comprising information about a type of assistance required by the user of the portable communications device for accessing goods or services from the at least one selected provider;

determining, by the server, a separation between the portable communications device and the at least one selected provider;

setting at least one separation trigger when the separation decreases to a predetermined separation;

periodically monitoring the separation by using the GPS location detector to detect the location of the portable communications device; and sending, by the server via the network, at least one second message to the at least one selected provider when the separation reaches the at least one separation trigger.

2. A method according to claim 1, further comprising including the separation in the at least one first message.

3. A method according to claim 1, wherein at least one of the at least one first message and the at least one second message comprises information about the user of the portable communications device.

4. A method according to claim 1, wherein at least one of the at least one first message and the at least one second message comprises information about a vehicle the user is travelling in.

5. A method according to claim 4, wherein the information includes at least one photograph.

6. A method according to claim 1, wherein the separation comprises a distance.

7. A method according to claim 1, wherein the separation comprises an estimated journey time for the user to arrive at the at least one selected provider.

8. A method according to claim 1, wherein the separation trigger is a geofence.

9. A method according to claim 8, wherein the geofence is defined by a radius around the at least one selected provider.

10. A method according to claim 8, wherein the geofence is defined by a radius around the portable communications device.

11. A method according to claim 8, wherein the geofence is an area defined by connected lines around the at least one selected provider.

12. A method according to claim 1, wherein setting the at least one separation trigger comprises setting first and second separation triggers at first and second predetermined separations and wherein the at least one second message comprises two messages that are respectively sent to the at least one selected provider as each of the first and second separation triggers is reached.

13. A method of tracking and communicating information about a user of a portable communications device to a provider of goods or services with a computer system connected to a network, the method comprising the following steps performed by the computer system:

receiving, from the portable communications device, a location of the portable communications device and a request for a list of providers of goods or services relative to the location of the portable communications device, the portable communications device having an aerial for connecting to a network and a GPS location detector for detecting a location of the portable communications device;

sending, via the network, the list to the portable communications device;

receiving from the portable communications device at least one selected provider from the list of providers;

sending, via the network, at least one first message to the at least one selected provider indicating that the user of the portable communications device intends to travel to the at least one selected provider, the at least one first message comprising information about a type of assistance required by the user for accessing the goods or services from the at least one selected provider;

determining a separation between the portable communications device and the at least one selected provider;

setting at least one separation trigger when the separation decreases to a predetermined separation;

periodically receiving from the portable communications device a location of the portable communications device detected by the GPS location detector;

monitoring the separation; and sending, via the network, at least one second message to the at least one selected provider when the separation reaches the at least one separation trigger.

14. A method according to claim 13, further comprising including the separation in the at least one first message.

15. A method according to claim 13, wherein at least one of the at least one first message and the at least one second message comprises information about a vehicle the user is travelling in.

16. A method according to claim 13, wherein the separation trigger is a geofence.

17. A method according to claim 13, wherein setting the at least one separation trigger comprises setting first and second separation triggers at first and second predetermined separations and wherein the at least one second message comprises two messages that are respectively sent to the at least one selected provider as each of the first and second separation triggers is reached.

18. The method of claim 1, the type of assistance comprising breakdown assistance for a vehicle.

19. The method of claim 13, the type of assistance comprising breakdown assistance for a vehicle.

20. The method of claim 1, the type of assistance comprising assistance in filling a vehicle with fuel.

21. The method of claim 13, the type of assistance comprising assistance in filling a vehicle with fuel.

22. The method of claim 1, the type of assistance comprising assistance from emergency services.

23. The method of claim 13, the type of assistance comprising assistance from emergency services.

24. The method of claim 1, the type of assistance comprising assistance from a utility company.

25. The method of claim 13, the type of assistance comprising assistance from a utility company.

* * * * *